United States Patent [19]
Caldara et al.

[11] Patent Number: 5,748,629
[45] Date of Patent: May 5, 1998

[54] ALLOCATED AND DYNAMIC BANDWIDTH MANAGEMENT

[75] Inventors: Stephen A. Caldara, Sudbury; Stephen A. Hauser, Burlington; Thomas A. Manning, Northboro, all of Mass.; Robert B. McClure, Hollis, N.H.; Matthias L. Colsman, Cologne, Germany

[73] Assignees: Fujitsu Network Communications, Inc., Richardson, Tex.; Fujitsu Limited, Kawasaki, Japan

[21] Appl. No.: 683,152
[22] Filed: Jul. 18, 1996

Related U.S. Application Data

[60] Provisional application No. 60/001,498, Jul. 19, 1995.
[51] Int. Cl.[6] ........................................ H04J 3/22
[52] U.S. Cl. ..................... 370/389; 370/413; 370/468
[58] Field of Search ........................ 370/250, 252, 370/253, 351, 389, 391, 392, 395, 398, 399, 412, 413, 414, 428, 429, 465, 468, 230, 235; 340/825.15

[56] References Cited

U.S. PATENT DOCUMENTS

| | | | |
|---|---|---|---|
| 3,804,991 | 4/1974 | Hammond et al. | 379/222 |
| 4,069,399 | 1/1978 | Barrett et al. | 370/363 |
| 4,715,030 | 12/1987 | Koch et al. | 370/401 |
| 4,727,537 | 2/1988 | Nichols | 370/236 |
| 4,737,953 | 4/1988 | Koch et al. | 370/401 |
| 4,797,881 | 1/1989 | Ben-Artzi | 370/402 |
| 4,837,761 | 6/1989 | Isono et al. | 370/413 |
| 4,849,968 | 7/1989 | Turner | 370/232 |
| 4,870,641 | 9/1989 | Pattavina | 370/397 |
| 4,872,159 | 10/1989 | Hemmady et al. | 370/352 |
| 4,872,160 | 10/1989 | Hemmady et al. | 370/352 |
| 4,878,216 | 10/1989 | Yunoki | 370/389 |
| 4,893,302 | 1/1990 | Hemmady et al. | 370/427 |
| 4,893,307 | 1/1990 | McKay et al. | 370/389 |
| 4,894,824 | 1/1990 | Hemmady et al. | 370/380 |
| 4,897,841 | 1/1990 | Gang, Jr. | 370/401 |
| 4,899,333 | 2/1990 | Roediger | 370/427 |
| 4,920,531 | 4/1990 | Isono et al. | 370/416 |
| 4,922,503 | 5/1990 | Leone | 370/402 |

(List continued on next page.)

OTHER PUBLICATIONS

*Head of Line Arbitration in ATM Switches With Input-Output Buffering and Backpressure Control.* By Hosein F. Badran and H. T. Mouftah, *Globecom* '91, pp. 0347–0351.

An Ascom Timeplex White Paper, *Meeting Critical Requirements with Scalable Enterprise Networking Solutions Based on a Unified ATM Foundation*, pp. 1–12, Apr. 1994–Apr. 1995.

Douglas H. Hunt, *ATM Traffic Management—Another Perspective*, Business Communications Review, Jul. 1994.

(List continued on next page.)

*Primary Examiner*—Benedict V. Safourek
*Assistant Examiner*—Seema S. Rao
*Attorney, Agent, or Firm*—Weingarten, Schurgin, Gagnebin & Hayes LLP

[57] ABSTRACT

An ATM network switch and method of utilization for adaptively providing integrated services therein is disclosed. In providing such integrated services, if the allocated bandwidth for one connection has been consumed, or if the connection is not entitled to allocated bandwidth, the connection can optionally use dynamic bandwidth arbitration, or a combination of both allocated and dynamic. The switch includes an input port processor, a bandwidth arbiter, and an output port processor. Cells are transmitted from the input to the output, under the control of respective port processors and the bandwidth arbiter. Flow control is implemented on a per-connection basis. Individual queues are then assigned to traffic type groups in order to provide traffic type flow control. Based upon prioritization information associated with the cell at the input, cells are prioritized and transmitted from the output, with each cell maintained in the same order, relative to other cells on a connection, in which it was received.

51 Claims, 10 Drawing Sheets

U.S. PATENT DOCUMENTS

| | | | |
|---|---|---|---|
| 4,933,938 | 6/1990 | Sheehy | 370/401 |
| 4,947,390 | 8/1990 | Sheehy | 370/401 |
| 4,956,839 | 9/1990 | Torii et al. | 370/232 |
| 4,958,341 | 9/1990 | Hemmady et al. | 370/352 |
| 4,979,100 | 12/1990 | Makris et al. | 364/260 |
| 4,993,018 | 2/1991 | Hajikano et al. | 370/392 |
| 5,021,949 | 6/1991 | Morten et al. | 364/229 |
| 5,029,164 | 7/1991 | Goldstein et al. | 370/235 |
| 5,060,228 | 10/1991 | Tsutsui et al. | 370/402 |
| 5,067,123 | 11/1991 | Hyodo et al. | 370/396 |
| 5,070,498 | 12/1991 | Kakuma et al. | 370/233 |
| 5,084,867 | 1/1992 | Tachibana et al. | 370/399 |
| 5,084,871 | 1/1992 | Carn et al. | 370/462 |
| 5,090,011 | 2/1992 | Fukuta et al. | 370/230 |
| 5,090,024 | 2/1992 | Vander Mey et al. | 375/207 |
| 5,115,429 | 5/1992 | Hluchyj et al. | 370/231 |
| 5,119,369 | 6/1992 | Tanabe et al. | 370/399 |
| 5,119,372 | 6/1992 | Verbeek | 370/230 |
| 5,128,932 | 7/1992 | Li | 370/236 |
| 5,130,975 | 7/1992 | Akata | 370/416 |
| 5,132,966 | 7/1992 | Hayano et al. | 370/233 |
| 5,146,560 | 9/1992 | Goldberg et al. | 395/376 |
| 5,150,358 | 9/1992 | Punj et al. | 370/418 |
| 5,151,897 | 9/1992 | Suzuki | 370/401 |
| 5,157,657 | 10/1992 | Potter et al. | 370/440 |
| 5,163,045 | 11/1992 | Caram et al. | 370/409 |
| 5,179,558 | 1/1993 | Thacker et al. | 370/406 |
| 5,185,743 | 2/1993 | Murayama et al. | 370/397 |
| 5,191,582 | 3/1993 | Upp | 370/392 |
| 5,191,652 | 3/1993 | Dias et al. | 395/200.81 |
| 5,193,151 | 3/1993 | Jain | 395/200.67 |
| 5,197,067 | 3/1993 | Fujimoto et al. | 370/236 |
| 5,199,027 | 3/1993 | Barri | 370/231 |
| 5,239,539 | 8/1993 | Uchida et al. | 370/398 |
| 5,253,247 | 10/1993 | Hirose et al. | 370/250 |
| 5,253,248 | 10/1993 | Dravida et al. | 370/228 |
| 5,255,264 | 10/1993 | Cotton et al. | 370/286 |
| 5,255,266 | 10/1993 | Watanabe et al. | 370/233 |
| 5,257,311 | 10/1993 | Naito et al. | 380/48 |
| 5,258,979 | 11/1993 | Oomuro et al. | 370/232 |
| 5,265,088 | 11/1993 | Takigawa et al. | 370/249 |
| 5,267,232 | 11/1993 | Katsube et al. | 370/230 |
| 5,268,897 | 12/1993 | Komine et al. | 370/400 |
| 5,271,010 | 12/1993 | Miyake et al. | 370/392 |
| 5,272,697 | 12/1993 | Fraser et al. | 370/235 |
| 5,274,641 | 12/1993 | Shobatake et al. | 370/392 |
| 5,274,768 | 12/1993 | Traw et al. | 395/850 |
| 5,280,469 | 1/1994 | Taniguchi et al. | 370/250 |
| 5,280,470 | 1/1994 | Buhrke et al. | 370/232 |
| 5,282,201 | 1/1994 | Frank et al. | 370/403 |
| 5,283,788 | 2/1994 | Morita et al. | 370/236 |
| 5,285,446 | 2/1994 | Yonehara | 370/230 |
| 5,287,349 | 2/1994 | Hyodo et al. | 370/399 |
| 5,287,535 | 2/1994 | Sakagawa et al. | 370/389 |
| 5,289,462 | 2/1994 | Ahmadi et al. | 370/232 |
| 5,289,463 | 2/1994 | Mobasser | |
| 5,291,482 | 3/1994 | McHarg et al. | 370/413 |
| 5,295,134 | 3/1994 | Yoshimura et al. | 370/220 |
| 5,301,055 | 4/1994 | Bagchi et al. | 370/395 |
| 5,301,190 | 4/1994 | Tsukuda et al. | 370/398 |
| 5,301,193 | 4/1994 | Toyofuku et al. | 370/395 |
| 5,305,311 | 4/1994 | Lyles | 370/390 |
| 5,309,431 | 5/1994 | Tominaga et al. | 370/230 |
| 5,309,438 | 5/1994 | Nakajima | 370/395 |
| 5,311,586 | 5/1994 | Bogart et al. | 379/221 |
| 5,313,454 | 5/1994 | Bustini et al. | 370/231 |
| 5,313,458 | 5/1994 | Suzuki | 370/389 |
| 5,315,586 | 5/1994 | Charvillat | 370/232 |
| 5,319,638 | 6/1994 | Lin | 370/400 |
| 5,333,131 | 7/1994 | Tanabe et al. | 370/410 |
| 5,333,134 | 7/1994 | Ishibashi et al. | 364/230 |
| 5,335,222 | 8/1994 | Kamoi et al. | 370/230 |
| 5,335,325 | 8/1994 | Frank et al. | 395/200 |
| 5,339,317 | 8/1994 | Tanaka et al. | 370/460 |
| 5,339,318 | 8/1994 | Tanaka et al. | 370/399 |
| 5,341,366 | 8/1994 | Soumiya et al. | 370/233 |
| 5,341,373 | 8/1994 | Ishibashi et al. | 370/440 |
| 5,345,229 | 9/1994 | Olnowich et al. | 340/825.8 |
| 5,350,906 | 9/1994 | Brody et al. | 235/379 |
| 5,357,506 | 10/1994 | Sugawara | 370/392 |
| 5,357,507 | 10/1994 | Hughes et al. | 370/234 |
| 5,357,508 | 10/1994 | Le Boudec et al. | 370/397 |
| 5,357,510 | 10/1994 | Norizuki et al. | 370/395 |
| 5,359,600 | 10/1994 | Ueda et al. | 370/399 |
| 5,361,251 | 11/1994 | Aihara et al. | 370/252 |
| 5,363,433 | 11/1994 | Isono | 379/390 |
| 5,371,893 | 12/1994 | Price et al. | 395/729 |
| 5,373,504 | 12/1994 | Tanaka et al. | 370/253 |
| 5,375,117 | 12/1994 | Morita et al. | 370/420 |
| 5,377,262 | 12/1994 | Bales et al. | 379/220 |
| 5,377,327 | 12/1994 | Jain et al. | 395/200.65 |
| 5,379,297 | 1/1995 | Glover et al. | 370/234 |
| 5,390,170 | 2/1995 | Sawant et al. | 370/399 |
| 5,390,175 | 2/1995 | Hiller et al. | 370/398 |
| 5,394,397 | 2/1995 | Yanagi et al. | 370/395 |
| 5,400,337 | 3/1995 | Munter | 370/399 |
| 5,412,648 | 5/1995 | Fan | 370/414 |
| 5,432,713 | 7/1995 | Takeo et al. | 364/514 |
| 5,440,547 | 8/1995 | Easki et al. | 370/395 |
| 5,444,702 | 8/1995 | Burnett et al. | 370/254 |
| 5,446,733 | 8/1995 | Tsuruoka | 370/232 |
| 5,446,738 | 8/1995 | Kim et al. | 370/395 |
| 5,450,406 | 9/1995 | Esaki et al. | 370/396 |
| 5,452,296 | 9/1995 | Shimizu | 370/399 |
| 5,455,825 | 10/1995 | Lauer et al. | 370/413 |
| 5,459,743 | 10/1995 | Fukuda et al. | 370/399 |
| 5,463,620 | 10/1995 | Sriram | 370/412 |
| 5,479,401 | 12/1995 | Bitz et al. | 370/397 |
| 5,479,402 | 12/1995 | Hata et al. | 370/397 |
| 5,485,455 | 1/1996 | Dobbins et al. | 370/255 |
| 5,487,063 | 1/1996 | Kakuma et al. | 370/396 |
| 5,493,566 | 2/1996 | Ljungberg et al. | 370/231 |
| 5,497,369 | 3/1996 | Wainwright | 370/390 |
| 5,504,742 | 4/1996 | Kakuma et al. | 370/420 |
| 5,506,834 | 4/1996 | Sekihata et al. | 370/253 |
| 5,506,839 | 4/1996 | Hatta | 370/236 |
| 5,509,001 | 4/1996 | Tachibana et al. | 370/230 |
| 5,509,007 | 4/1996 | Takashima et al. | 370/391 |
| 5,513,134 | 4/1996 | Cooperman et al. | 365/49 |
| 5,513,178 | 4/1996 | Tanaka | 370/395 |
| 5,513,180 | 4/1996 | Miyake et al. | 370/352 |
| 5,515,359 | 5/1996 | Zheng | 370/231 |
| 5,517,495 | 5/1996 | Lund et al. | 370/414 |
| 5,519,690 | 5/1996 | Suzuka et al. | 370/395 |
| 5,521,917 | 5/1996 | Watanabe et al. | 370/399 |
| 5,521,923 | 5/1996 | Willmann et al. | 370/412 |
| 5,523,999 | 6/1996 | Takano et al. | 370/389 |
| 5,528,590 | 6/1996 | Iidaka et al. | 370/395 |
| 5,533,020 | 7/1996 | Byrn et al. | 370/395 |
| 5,535,196 | 7/1996 | Aihara et al. | 370/429 |
| 5,537,394 | 7/1996 | Abe et al. | 370/252 |
| 5,541,912 | 7/1996 | Choudhury et al. | 370/412 |
| 5,544,169 | 8/1996 | Norizuki et al. | 370/395 |
| 5,544,170 | 8/1996 | Kasahara | 370/253 |
| 5,550,821 | 8/1996 | Akiyoshi | 370/352 |
| 5,550,823 | 8/1996 | Irie et al. | 370/413 |
| 5,553,057 | 9/1996 | Nakayama | 370/241 |
| 5,555,243 | 9/1996 | Kakuma et al. | 370/352 |
| 5,555,265 | 9/1996 | Kakuma et al. | 370/395 |
| 5,568,479 | 10/1996 | Watanabe et al. | 370/399 |
| 5,570,361 | 10/1996 | Norizuki et al. | 370/395 |
| 5,570,362 | 10/1996 | Nishimura | 370/395 |

| | | | |
|---|---|---|---|
| 5,572,522 | 11/1996 | Calamvokis et al. | 370/395 |
| 5,577,032 | 11/1996 | Sone et al. | 370/390 |
| 5,583,857 | 12/1996 | Soumiya et al. | 370/233 |
| 5,583,858 | 12/1996 | Hanaoka | 370/392 |
| 5,583,861 | 12/1996 | Holden | 370/395 |
| 5,590,132 | 12/1996 | Ishibashi et al. | 370/236 |
| 5,602,829 | 2/1997 | Nie et al. | 370/235 |
| 5,610,913 | 3/1997 | Tomonaga et al. | 370/219 |
| 5,623,405 | 4/1997 | Isono | 395/230 |
| 5,625,846 | 4/1997 | Kobayakawa et al. | 395/872 |
| 5,633,861 | 5/1997 | Hanson et al. | 370/412 |
| 5,677,906 | 10/1997 | Hayler et al. | 370/235 |

OTHER PUBLICATIONS

Richard Bubenik et al., *Leaf Initiated Join Extensions*, Technical Committee, Signalling Subworking Group, ATM Forum/94–0325R1, Jul. 1, 1994.

Douglas H. Hunt et al., *Flow Controlled Virtual Connections Proposal for ATM Traffic Management* (Revision R2), Traffic Management Subworking Group, ATM Forum/ 94–0632R2, Aug. 1994.

Flavio Bonomi et al., *The Rate–Based Flow Control Framework for the Available Bit Rate ATM Service*, IEEE Network, Mar./Apr. 1995, pp. 25–39.

R. Jain, *Myths About Congestion Management in High Speed Networks*, Internetworking Research and Experience, vol. 3, 101–113 (1992).

Douglas H. Hunt et al., *Credit–Based FCVC Proposal for ATM Traffic Management* (Revision R1), ATM Forum Technical Committee Traffic Management Subworking Group, ATM Forum/94–0168R1, Apr. 28, 1994.

Douglas H. Hunt et al., *Action Item Status for Credit–Based FCVC Proposal*, ATM Forum Technical Committee Traffic Management Subworking Group, ATM Forum/94–0439, Apr. 28, 1994.

Timothy P. Donahue et al., *Arguments in Favor of Continuing Phase 1 as the Initial ATM Forum P–NNI Routing Protocol Implementation*, ATM Forum Technical Committee, ATM Forum/94–0460, Apr. 28, 1994.

Richard Bubenick et al., *Leaf Initiated Join Extensions*, Technical Committee, Signalling Subworking Group, ATM Forum/94–0325, Apr. 28, 1994.

Rob Coltun et al., *PRP: A P–NNI Routing Protocol Proposal*, ATM Forum Technical Committee, ATM Forum/ 94–0492, Apr. 28, 1994.

Richard Bubenik et al., *Leaf Initiated Join Extensions*, ATM Forum Technical Committee, Signalling Subworking Group, ATM Forum 94–0325, Apr. 28, 1994.

Richard Bubenik et al., *Requirements For Phase 2 Signaling Protocol*, ATM Forum Technical Committee, Signalling Subworking Group, ATM Forum 94–1078, Jan. 1, 1994.

SITA, ATM RFP: C–Overall Technical Requirements, Sep. 1994.

ALLOCATED AND DYNAMIC BANDWIDTH MANAGEMENT

RELATED APPLICATION

This application claims benefit of U.S. Provisional Application Ser. No. 60/001,498, filed Jul. 19, 1995.

FIELD OF THE INVENTION

The invention generally relates to the field of telecommunications networks, and specifically to bandwidth allocation and delay management in an asynchronous transfer mode switch.

BACKGROUND OF THE INVENTION

Telecommunications networks such as asynchronous transfer mode ("ATM") networks are used for transfer of audio, video and other data. ATM networks deliver data by routing data units such as ATM cells from source to destination through switches. Switches include input/output ("I/O") ports through which ATM cells are received and transmitted. The appropriate output port for transmission of the cell is determined based on the cell header.

In configuring a network element such as a switch for the optimal transfer of various traffic types (sometimes referred to as a service classes) supported by ATM networks, multiple factors such as throughput delay and desired bandwidth must be considered. Such traffic types, each having its own delay and bandwidth requirements, include the constant bit rate ("CBR") service class, the variable bit rate ("VBR") service class, the available bit rate ("ABR") service class, and the unspecified bit rate ("UBR") service class.

The primary differentiator between the service classes is delay. Telecommunications network applications such as teleconferencing require deterministic delay bounds, and are typically assigned to the CBR service class. Transaction processing applications such as automated teller machines require a "tightly bounded" delay specification to provide acceptable response times. Such applications typically are assigned to the VBR service class. File transfer applications such as internetwork traffic merely require a "bounded" delay, and thus typically employ the ABR service classes. The UBR service class normally provides no delay bound.

Bandwidth is another consideration in establishing an acceptable switch configuration. Video applications typically have a predictable bandwidth requirement, while file transfer applications are much more aperiodic, or "bursty."

Low-delay and complete line utilization are opposing goals when multiplexing asynchronous sources. High utilization is achieved by having a set of connections share bandwidth that is unused by connections that need very low delay. This shared bandwidth is known as dynamic bandwidth because it is distributed to connections based on instantaneous operating conditions. VBR, ABR and UBR utilize dynamic bandwidth to achieve high line utilization.

A network switch capable of adaptively accommodating network traffic having such dissimilar delay and bandwidth requirements, and thus providing low-cost, highly efficient integrated services, is required.

SUMMARY OF THE INVENTION

Integrated services is the accommodation of various traffic types, wherein each of the traffic types is characterized by delay bounds and by guaranteed bandwidth, and wherein each of the traffic types receives allocated bandwidth, dynamic bandwidth, or a combination of both. The presently disclosed invention is an ATM network switch and method capable of adaptively providing highly efficient, and thus low cost, integrated services therein. In providing such integrated services, if the input rate for a connection is greater than its allocated bandwidth, the connection can optionally use dynamic bandwidth.

In general overview, the switch includes at least one input port, at least one output port, and input and output buffers associated with the respective input and output ports. Cells enter the switch through the input port and are buffered in the input buffers. The cells are then transmitted from the input buffers to the output buffers, under the control of respective port processors and a Bandwidth Arbiter ("BA"), and then transmitted to the appropriate output port.

In order to provide both connection and traffic type isolation, the buffers are grouped into queues and flow control is implemented on a per queue basis. Each queue includes multiple buffers, and each switch includes multiple input queues and multiple output queues. Upon entering the switch, each cell is loaded into an input cell buffer belonging to a particular input queue for eventual transmission to an output cell buffer belonging to a particular output queue. Per VC queuing enables connection-level flow control, since cells are grouped according to the input and output port pair they traverse. Individual queues are then assigned to traffic type groups in order to facilitate traffic type flow control. For example, each queue is dedicated to a particular traffic type (sometimes referred to as a service class) such as the variable bit rate ("VBR") service class and the available bit rate ("ABR") service class as described above.

In addition to the differentiation of cell traffic into the service categories described above, further levels of priority are introduced within each category because different applications within a category may have different sensitivity to delay. For example, a file transfer performed by a back-up application can tolerate longer delays than a file transfer of a medical image to an awaiting physician. Flow control can also be implemented on these traffic sub-types, with each queue being assigned to a particular connection, thereby providing flow control on a per-connection basis as well as on a per-service category basis.

It is then possible for the presently disclosed network switch to provide integrated services by transferring input cells to output buffers using bandwidth assigned specifically to such connections ("allocated bandwidth"), by transferring input cells to output buffers using bandwidth which is instantaneously unallocated by connections requiring allocated bandwidth ("dynamic bandwidth"), and by transferring input cells to output buffers utilizing a mix of both allocated and dynamic bandwidth.

Bandwidth arbitration, or the matching of available receivers to transmitters needing to transmit cells to that set of receivers, begins with a determination of what bandwidth is available.

A To Switch Port Processor ("TSPP") is responsible for receiving a cell from a unidirectional transmission path known as a "link," for analyzing cell header information to identify a connection with which the cell is associated, and for buffering the cell in accordance with the service class and subclass priority associated with the respective connection. Further, the TSPP is responsible for transferring the cell from the buffer to one or more From Switch Port Processors ("FSPPs") using the associated switch fabric. The bandwidth employed for such transfer can be either allocated or dynamic, or both, as previously characterized.

To manage the allocated bandwidth, the TSPP employs a time slotted frame concept through the use of a Switch Allocation Table ("SAT"). The TSPP also uses two data structures in managing different resources, a queue and a list. A queue is used to manage buffers, and consists of a group of one or more buffered cells organized as a FIFO and manipulated as a linked list using pointers. Incoming cells are added (enqueued) to the tail of the queue. Cells which are sent to the switch fabric are removed (dequeued) from the head of the queue. Cell ordering is always maintained. For a given connection, the sequence of cells that is sent to the switch fabric is identical to that in which they arrived although the time intervals between each departing cell may be different from the inter-cell arrival times.

Valid SAT entries provide a pointer to a "scheduling list," in which is maintained a list of queues which may have cells intended for transfer to a particular output port. A scheduling list consists of one or more queue numbers organized as a circular list. As with queues, lists are manipulated as a linked-list structure using pointers. Queue numbers are added to the tail of a list and removed from the head of the list. A queue number can appear only once on any given scheduling list. In addition to being added and removed, queue numbers are recirculated on a list by removing from the head and then adding the removed queue number back onto the tail. This results in round-robin servicing of the queues on a particular list.

Allocated time slots which cannot be used at a given instant in time or valid SAT entries where there is no cell to send for that connection cause the TSPP to notify the BA that it can use that time slot as a dynamic bandwidth cell time for any of the TSPPs associated with the switch. In this way, service classes requiring either or both of allocated and dynamic bandwidth are accommodated.

Cells received through the switch fabric are received by the FSPP associated with the appropriate output port. Based upon prioritization information associated with the cell at the TSPP, the cells are prioritized and transmitted, with each cell maintained in the same order, relative to other cells on a connection, in which it was received.

BRIEF DESCRIPTION OF THE DRAWINGS

The invention will be more fully understood by reference to the following description and accompanying drawings of which.

DETAILED DESCRIPTION

Figure 1:
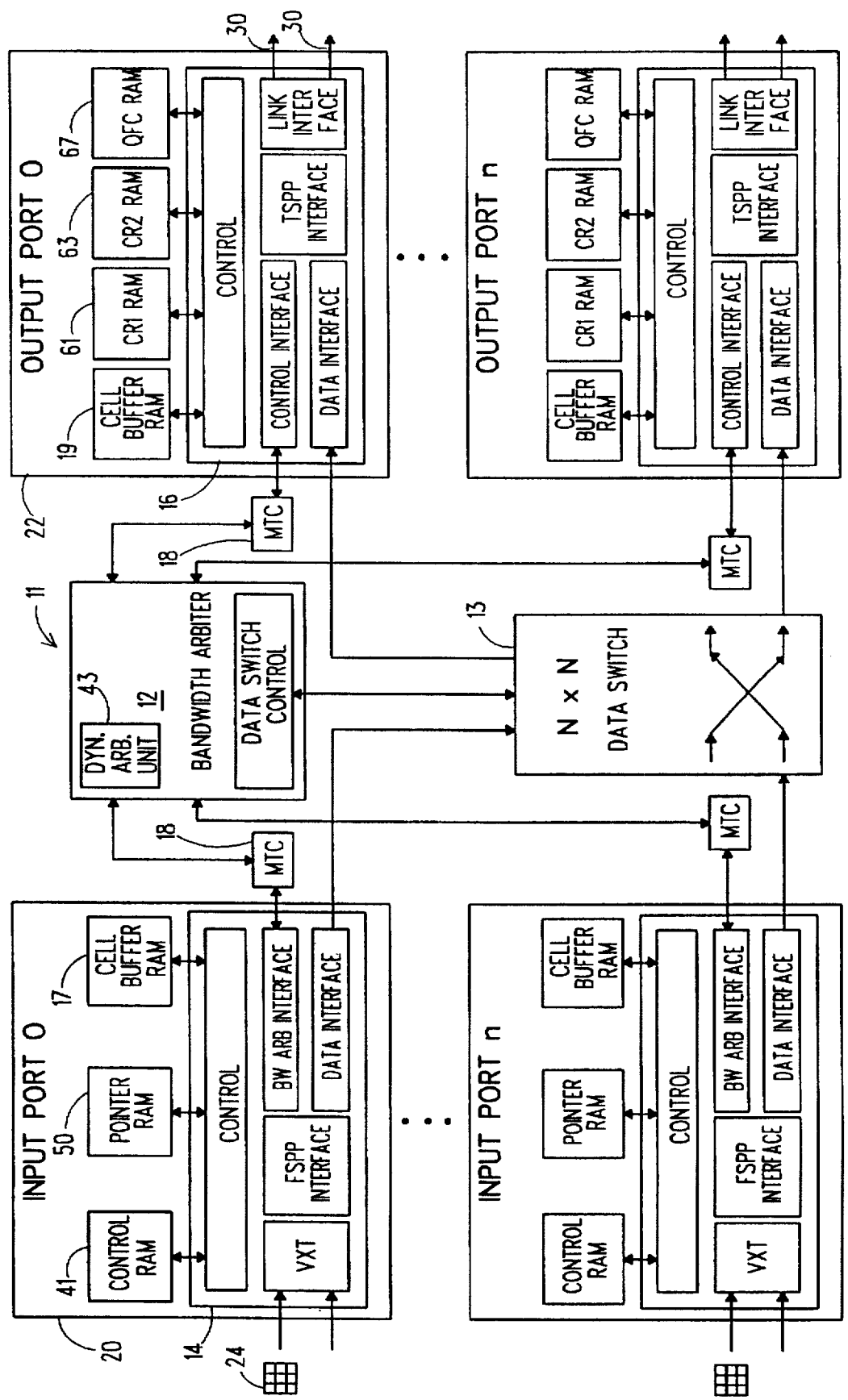
FIG. 1 is a block diagram of a switch according to the present invention.

Referring now to FIG. 1, the presently disclosed switch 10 includes a plurality of input ports 20, a plurality of output ports 22 and an NxN switch fabric 11, such as a cross point switch, coupled between the input ports 20 and output ports 22. Each input port 20 includes a To Switch Port Processor ("TSPP") ASIC 14 and each output port 22 includes a From Switch Port Processor ("FSPP") ASIC 16. A Multipoint Topology Controller ("MTC") ASIC 18 is coupled between each TSPP 14 and a bandwidth arbiter ("BA") ASIC 12, and as well as between the bandwidth arbiter 12 and each FSPP 16, as shown. In one embodiment, each MTC supports up to four TSPPs 14 or FSPPs 16.

The switch fabric 11 includes a data crossbar 13 for data cell transport and the bandwidth arbiter 12 and MTCs 18 for control signal transport. The Bandwidth Arbiter ("BA") ASIC 12 controls, inter alia, transport of data cells from a TSPP 14 to one or more FSPPs 16 through the data crossbar 13 (i.e., switch port scheduling), including the dynamic scheduling of momentarily unassigned bandwidth (as further described below). Each FSPP 16 receives cells from the data crossbar 13 and schedules transmission of those cells onto network links 30 (i.e., link scheduling).

Figure 2:
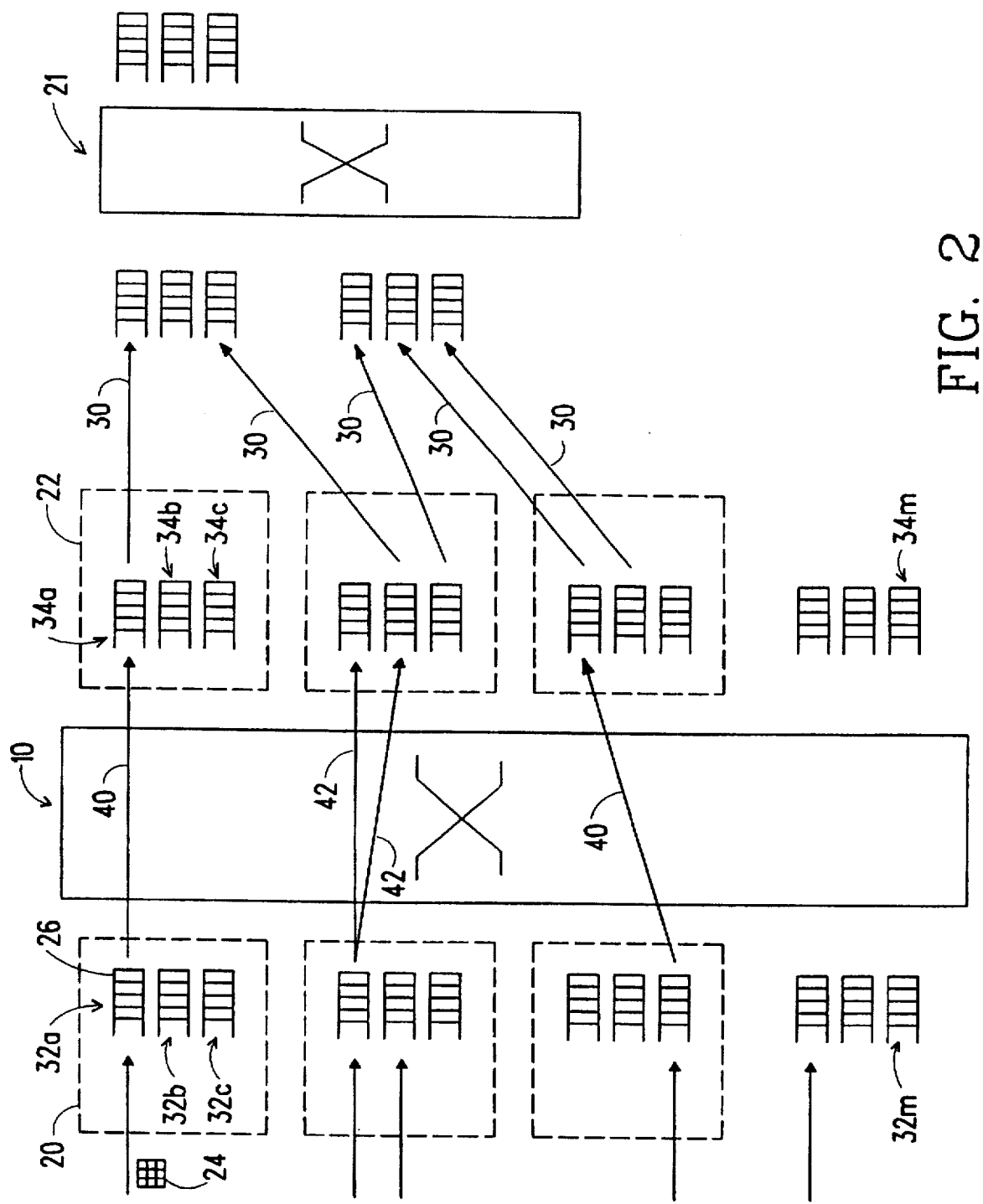
FIG. 2 is a block diagram illustrating point-to-point and point-to-multipoint operation in the switch of FIG. 1.

Each of the input ports 20 and output ports 22 includes a plurality of input buffers 26 and output buffers 28, respectively (FIG. 2). The buffers 26, 28 are organized into a plurality of input queues 32a–m (referred to herein generally as input queues 32) and a plurality of output queues 34a–m (referred to herein generally as output queues 34), respectively. More particularly, each input port 20 includes a plurality of input queues 32 and each output port includes a plurality of output queues 34, as shown. The input queues 32 are stored in a Control RAM 41 and a Pointer RAM 50 of the input port 20 and the output queues 34 are stored in a CR1 RAM 61 and a CR2 RAM 63 of the output port 22. The actual cell buffering occurs in Cell Buffer RAM 17, with the queues 32 having pointers to this buffer RAM 17.

To traverse the switch 10, a data cell 24 enters the switch through an input port 20 and is enqueued on an input queue 32 at the respective TSPP 14. The cell is then transmitted from the input queue 32 to one or more output queues 34 via the data crossbar 13. Control signals are transmitted from a TSPP 14 to one or more FSPPs 16 via the respective MTC 18 and the bandwidth arbiter 12. In particular, data and control signals may be transmitted from an input queue 32 to a particular one of the output queues 34, in the case of a point-to-point connection 40. Alternatively, data and control signals may be transmitted from an input queue 32 to a selected set of output queues 34, in the case of a point-to-multipoint connection 42. From the output queue(s) 34, the data cell 24 is transmitted outside of the switch 10, for example, to another switch 21 via a network 30.

The bandwidth arbiter 12 contains a crossbar controller 15 which includes probe crossbar, an XOFF crossbar and an XON crossbar, each of which is an NxN switch. A transfer request message, or probe control signal, flows through the probe crossbar and is used to query whether or not sufficient space is available at a destination output queue, or queues 34, to enqueue a cell. The request message is considered a "forward" control signal since its direction is from a TSPP 14 to one or more FSPPs 16 (i.e., the same direction as data). A two bit control signal flows in the reverse direction (from one or more FSPPs to a TSPP) through the XOFF crossbar and responds to the request message query by indicating whether or not the destination output queue, or queues 34, are presently capable of accepting data cells and thus, whether or not the transmitting TSPP can transmit cells via the data crossbar 13. In the event that the XOFF control signal indicates that the queried output queue(s) 34 are not presently capable of receiving data, another reverse control signal, which flows through the XON crossbar, notifies the transmitting TSPP once space becomes available at the destination output queue(s) 34.

Each output port 22 contains four memories: a Control RAM 1 (CR1 RAM) 61, a Control RAM 2 (CR2 RAM) 63, a Cell Buffer RAM 19, and a Quantum Flow Control RAM (QFC RAM). The Cell Buffer RAM 19 is where the actual cells are buffered while they await transmission. The CR1 RAM 61 and the CR2 RAM 63 contain the output queues 34, with each queue 34 containing pointers to cells in the Cell Buffer RAM 19. The CR1 RAM 61 contains information required to implement scheduling lists used to schedule link access by the output queues 34 associated with each link 30 supported by the FSPP 16. The QFC RAM 67 stores update information for transfer to another switch 29 via a network link 30. Update cells are generated in response to the update information provided by a TSPP 14 and specify whether the particular TSPP 14 is presently capable of accepting data cells.

In order to provide both connection and traffic type isolation, the buffers 26, 28 are organized into queues 32, 34 respectively and flow control is implemented on a per queue basis. Each queue includes multiple buffers, and each switch includes multiple input queues 32 and multiple output queues 34. Upon entering the switch, each cell 24 is loaded into a particular input queue 32 for eventual transmission to a particular output queue 34. By organizing input cells in queues by received (input) port and destination (output) port, connection level flow control is facilitated. For example, queues 32a, 34a could be dedicated to a particular connection. In addition, nested queues of queues may be employed to provide per subclass flow control.

Referring again to FIG. 1, the invention will now be described in greater detail. In the preferred architecture each input port includes a TSPP 14, and each output port includes an FSPP 16. The TSPPs and FSPPs each include cell buffer RAM which is organized into queues 32, 34, respectively. All cells in a connection 40 pass through a single queue at each port, one at the TSPP and one at the FSPP, for the life of the connection. The queues preserve cell ordering. This strategy also allows quality of service ("QoS") guarantees on a per connection basis. In the multipoint-to-point case, two or more queues are established to service the multiple sources.

As a cell is received into the TSPP 14, the first action performed by the TSPP is to check the cell header for errors and then to check that the cell is associated with a valid connection. To do this, the VPI/VCI fields specified in each cell header are employed as an index into a translation table known as the VXT which is stored in the Control RAM 41. The TSPP first checks to see if this connection is one previously set up by the control software. If recognized, the cell will then be assigned a queue number associated with the connection. At the same time, the cell is converted into an internal cell format by the TSPP.

The queue number is associated with a queue descriptor which is a table of state information that is unique to that source. After a cell is assigned a queue number from the VXT, the TSPP looks at the corresponding queue descriptor for further information on how to process the cell. The next operation is to try to assign a buffer for the cell. If available, the cell buffer number is enqueued to the tail of its respective queue and the cell is written out to external cell buffer RAM 32.

In addition to processing and buffering incoming cell streams, the TSPP must transfer the cells from the cell buffer to a group of one or more FSPPs using the switch fabric 11. The bandwidth used for such transfer can either be preassigned (i.e., allocated bandwidth) or dynamically assigned (i.e., dynamic bandwidth). The allocated bandwidth is assigned by Call Acceptance Control (CAC) software. The assignment of dynamic bandwidth depends on the instantaneous utilization of the switch resources, and is controlled by the Bandwidth Arbiter 12.

Allocated bandwidth is managed using a time slotted frame concept. With regard to FIG. 3, each TSPP has a data structure called a Switch Allocation Table ("SAT") 23 which is used to manage the allocated bandwidth. All TSPPs in the switch are synchronized such that they are all pointing, using a SAT pointer 25, to the same offset in the SAT at any given cell time. In a preferred embodiment, each slot in the SAT is active for 32 clock cycles at 50 Mhz, providing approximately 64 Kbps of cell payload bandwidth. Given a SAT depth of 8192, the pointers scan the SATs every approximately 6 msec, thereby providing a maximum delay for transmission opportunity of approximately 6 msec. The CAC software is responsible for assigning allocated bandwidth from TSPPs to FSPPs in a conflict-free manner.

Each cell time, the TSPP looks at the SAT entry for that cell time. A SAT entry is either not valid or points to a list of queues in TSPP Control RAM 41 called a scheduling list 27 (see FIG. 4). Queue descriptors for each of the queues are also stored in the Control RAM 41. If the SAT entry is invalid, that cell time is made available to the Bandwidth Arbiter for use in assigning dynamic bandwidth, as described below. Allocated cell time given up by a particular TSPP may be used as a dynamic bandwidth cell time; it may be used by the TSPP that gave up the slot or it may be given to a different TSPP for use. The decision of which TSPP gets a given dynamic cell time is made by the Bandwidth Arbiter.

Figure 3:
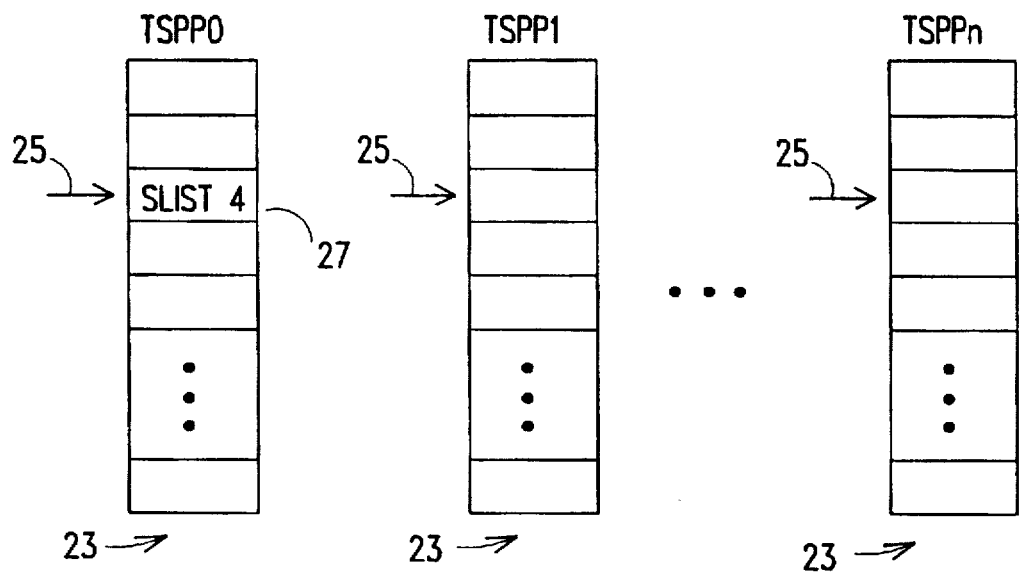
FIG. 3 illustrates Switch Allocation Tables according to the present invention.
Figure 4:
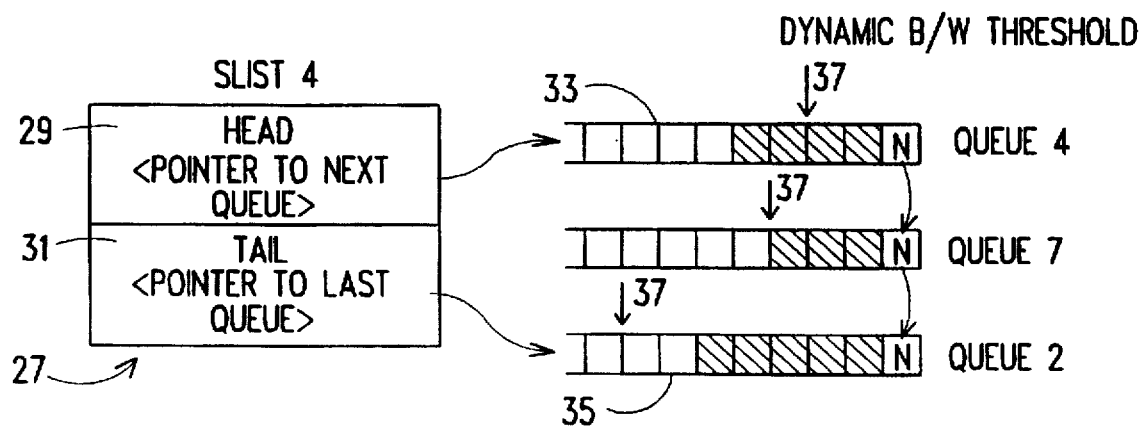
FIG. 4 illustrates a scheduling list and associated queues according to the present invention.

If the SAT entry contains a valid scheduling list number, as illustrated in FIG. 3 as SLIST 4 27, the TSPP will use the first queue on the referenced scheduling list as the source of the cell to be transferred during that cell time. This is accomplished by the scheduling list containing a "head" pointer 29 and a "tail" pointer 31, as shown in FIG. 4. The head pointer 29 is a pointer to a first queue 33 having a cell to be transmitted to a particular output port. The tail pointer 31 is a pointer to a last queue 35 having a cell to be transmitted to the same output port. Further, each queue associated with this list has a "next" pointer labelled "N" in FIG. 4 which points to the next queue in a sequence of queues. Though not illustrated in FIG. 4, each queue is a linked list, wherein the queue descriptor has a head pointer pointing to the first cell buffered in this queue, and a tail pointer pointing to the last cell buffered in this queue. Each buffered cell has a next pointer pointing to the next cell in the queue. Thus, as illustrated, the SAT for TSPP0 presently indicates that a cell time is available to scheduling list 4 27 (SLIST 4). The head pointer 29 of this scheduling list is pointing to queue 4 33, which has four cells ready to be transmitted to the respective output port. After the first cell from queue 4 has been transmitted through the switch fabric and the internal pointers of queue 4 have been modified to point to the second cell as the next cell for transmission, queue 4 33 now becomes the last of the three queues associated with SLIST 4 to be selected next time. Specifically, the head pointer of SLIST 4 is modified to point to queue 7, the tail pointer is modified to point to queue 4, and the header data of queue 2 is modified to point to queue 4. If queue 4 does not have another cell to be transmitted, the queue is dequeued, queue 7 is the next queue, and queue 2 is the last queue.

Cell times are made available to the Bandwidth Arbiter for assignment as dynamic bandwidth under the following conditions:

1) if the scheduling list identified by the SAT has no queue entry available, this case being referred to as "allocated, unused;" or 2) if the SAT has no scheduling list specified for a particular cell time slot, this case being referred to as "unallocated."

A further condition exists in the case where a pacing scheme is implemented in the TSPP to minimize initial delay in transferring a cell using allocated bandwidth. If a SAT slot for a particular scheduling list is indicated, but the pacing counter for that list has not reached the appropriate value, a cell from an associated queue is prevented from being transferred, and the slot becomes available for dynamic bandwidth transfer.

Dynamic bandwidth cell times are managed by taking advantage of a nested set of pointers, or what is referred to as a "list of lists" technique. In general, such a structure is presented in FIG. 5. A set of lists, labelled Dynamic Bandwidth Lists, has plural entries, labelled Port $0_1$, Port $0_2$, Port $0_3$, Port $0_4$, Port $1_1$, Port $1_2$, Port $1_3$, . . . . Each entry represents a dynamic bandwidth list for each port and priority (discussed below), and has a head pointer-tail pointer pair pointing to scheduling lists for port 0, priority 3. Thus, "Dynamic Bandwidth Lists" is comprised of entries which are themselves lists, or in other words, is a list of lists. The head pointer for Port $0_3$ points to scheduling list 12 (SLIST 12). SLIST 12 is the first of plural scheduling lists in the linked-list data structure called the dynamic bandwidth list for the port and priority. The tail pointer for Port $0_3$ points to the last entry in this linked-list structure, SLIST 5. Each scheduling list in the structure has a pointer to the next scheduling list in the same structure.

Each of SLISTs 12, 2 and 5 also has a head pointer-tail pointer pair pointing to at least one queue having a linked-list data structure. Specifically, the head pointer of SLIST 12 points to Queue 3 (labelled Q3), and the tail pointer of SLIST 12 points to the last queue in that queue-level linked list, Queue 11 (labelled Q11). Similarly, the head and tail pointers of SLIST 2 point to a single queue, Queue 8 (Q8), and the head and tail pointers of SLIST 5 point to Queues 2 and 6, respectively.

At the queue level, a head pointer for Q3 points to the first buffered cell in the queue, labelled C1, having a pointer to the buffered cell data ("C"), and a pointer ("N") to the next cell in the queue.

Figure 5:
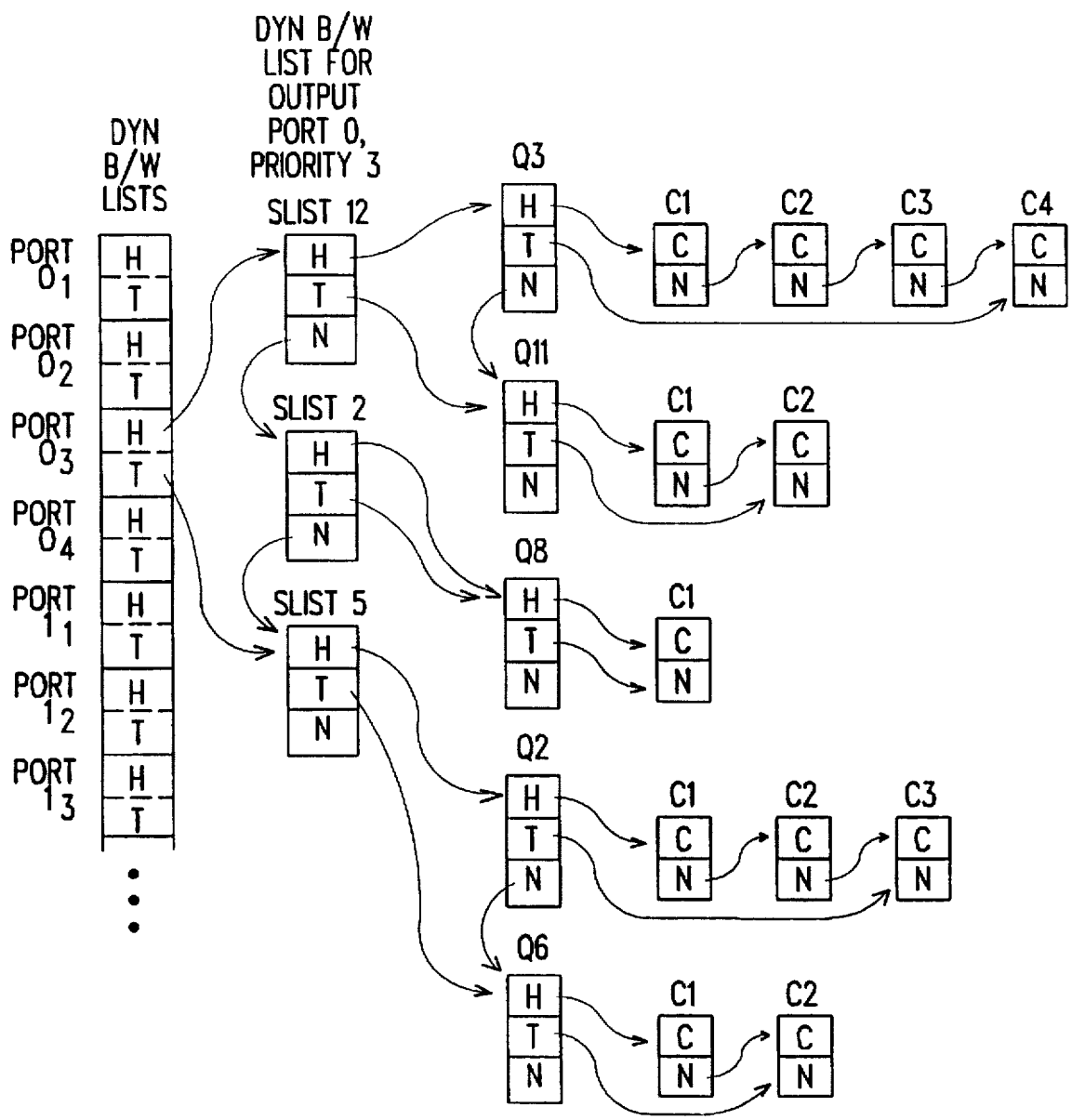
FIG. 5 illustrates a linked-list structure for multipoint-to-point and point-to-point transfer arbitration according to the present invention.

For point-to-point transmission, there is a one-to-one correspondence between scheduling list and queue. This is illustrated in FIG. 5 with SLIST 2 and Queue 8. For multipoint-to-point, there can be plural queues per scheduling list. Such is the case with SLIST 12 and Queues 3 and 11, and with SLIST 5 and Queues 2 and 6.

By implementing this overall "list of lists" structure in the presently disclosed ATM switch, multiple levels of control are provided. For instance, the first time an event occurs which enables one cell to be transmitted to Port $0_3$, a cell from the first cell in the first queue associated with scheduling list 12 will be selected. This is cell C1 of Queue 3. The pointers of the "Dynamic Bandwidth Lists" list and SLISTs 12 and 5 are adjusted such that SLIST 2 is the next scheduling list from which a cell is provided if dynamic bandwidth becomes available for transmission of a cell to output Port $0_3$. SLIST 5 would be second, and SLIST 12 would then be last. Similarly, Queue 3, having just provided a cell, becomes the last queue to be eligible to provide a cell vis a vis SLIST 12, with Queue 11 being the next. This occurs through the manipulation of pointers in SLIST 12 and Queues 3 and 11. Finally, cell C1, having been transmitted, is dequeued from Queue 3, meaning the pointers of Queue 3 are readjusted to point to C2 as next to be transmitted. Only if another cell is received into Queue 3 will another cell fall in to line behind cell 4.

Round-robin selection is thus enabled between the scheduling lists and the queues, with even bandwidth distribution being provided at each level. Other scheduling policies can be implemented if other bandwidth distributions are desired.

Figure 6:
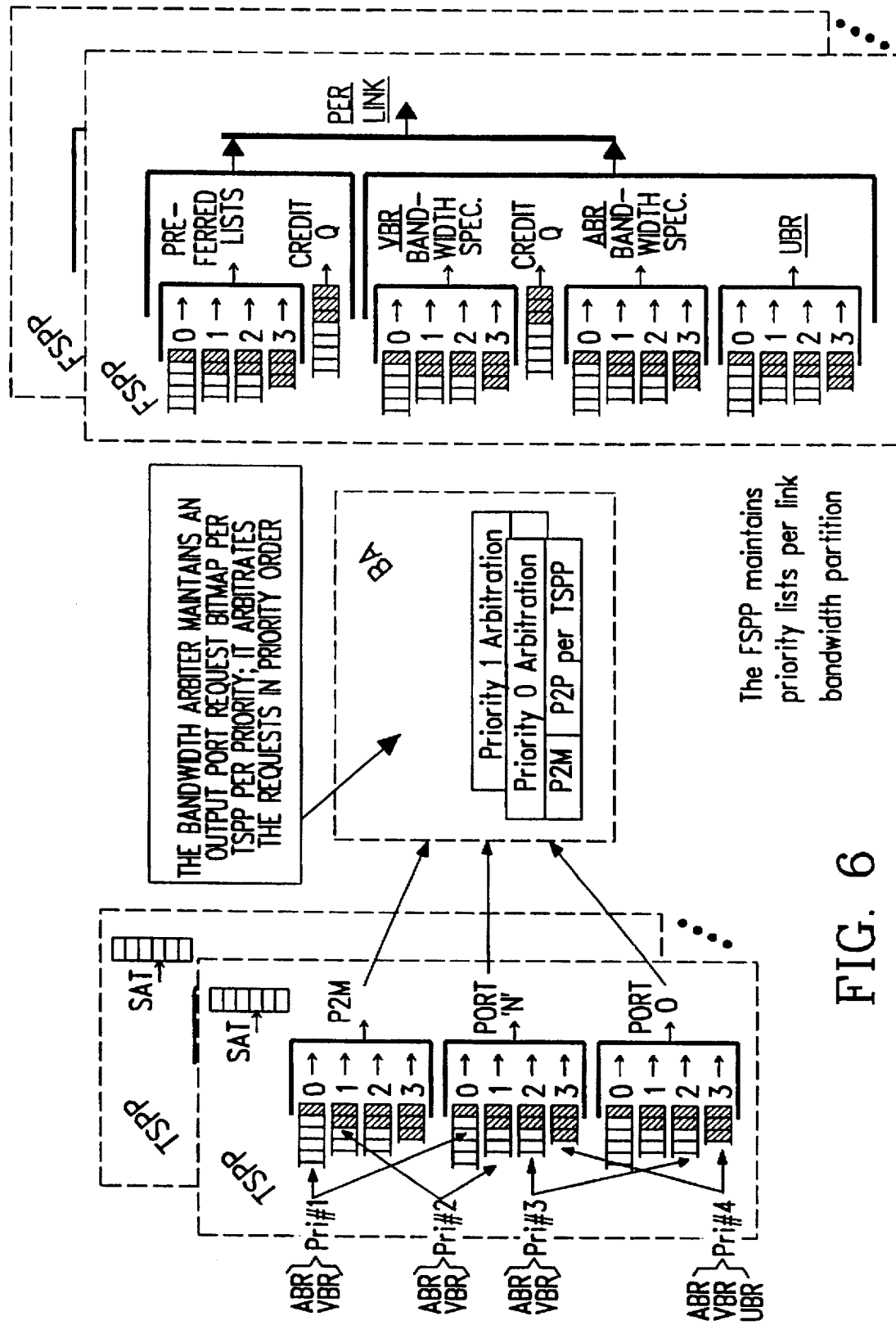
FIG. 6 illustrates the use of priority lists in the present invention.

As shown, the list of lists approach is applied to the allocation of dynamic bandwidth in the form of Dynamic Bandwidth Lists internal to the TSPP ASIC. 260 dynamic bandwidth lists are employed in the TSPP ASIC in a preferred embodiment. The first 256 of these lists are used for point-to-point ("P2P") and multipoint-to-point ("M2P") connections. Four lists are assigned to each one of the switch output ports. Four other lists are used for point-to-multipoint ("P2M") connections. This is shown at an upper-level in FIG. 6, where for each TSPP, there is a list of lists structure similar to that of FIG. 5.

In either the P2P or M2P case, when enough cells have been removed from a queue to reach a dynamic bandwidth threshold (discussed subsequently), the queue is dropped, or dequeued, from the linked list of queues. Further, when all queues for a particular scheduling list have been dequeued, the scheduling list is removed from the linked list of lists. If all scheduling lists for a particular entry in the linked list are removed, the pointers in the Dynamic Bandwidth List are given null values.

Another example of the application of the list of lists structure to the present ATM switch is described below with respect to Output Link Scheduling.

The priority of the scheduling lists is transmitted to the BA. The BA utilizes this priority information to effect the order in which it grants dynamic bandwidth to the TSPP. This prioritization is employed in assigning scheduling lists to one of the four dynamic bandwidth lists. In one embodiment of the disclosed switch, illustrated in FIG. 6, cells from the VBR and ABR service categories are subject to being assigned to any of the four priorities, and UBR cells are subject only to being assigned to the lowest priority dynamic bandwidth list.

Each queue for each connection has a dynamic bandwidth threshold 37 associated therewith, as shown in FIG. 4. If a queue buffer depth exceeds the cell depth indicated by the respective dynamic bandwidth threshold 37, the scheduling list for that queue will be added to the appropriate dynamic bandwidth list corresponding to the appropriate output port and priority. For each output port, the dynamic bandwidth list provides an indication of which if any cells are to be transmitted to the respective output port using dynamic bandwidth. The dynamic bandwidth threshold is established at call setup time. In a further embodiment of the present switch, however, the threshold value is adjusted dynamically based upon an empirical analysis of traffic through the switch.

Figure 7:
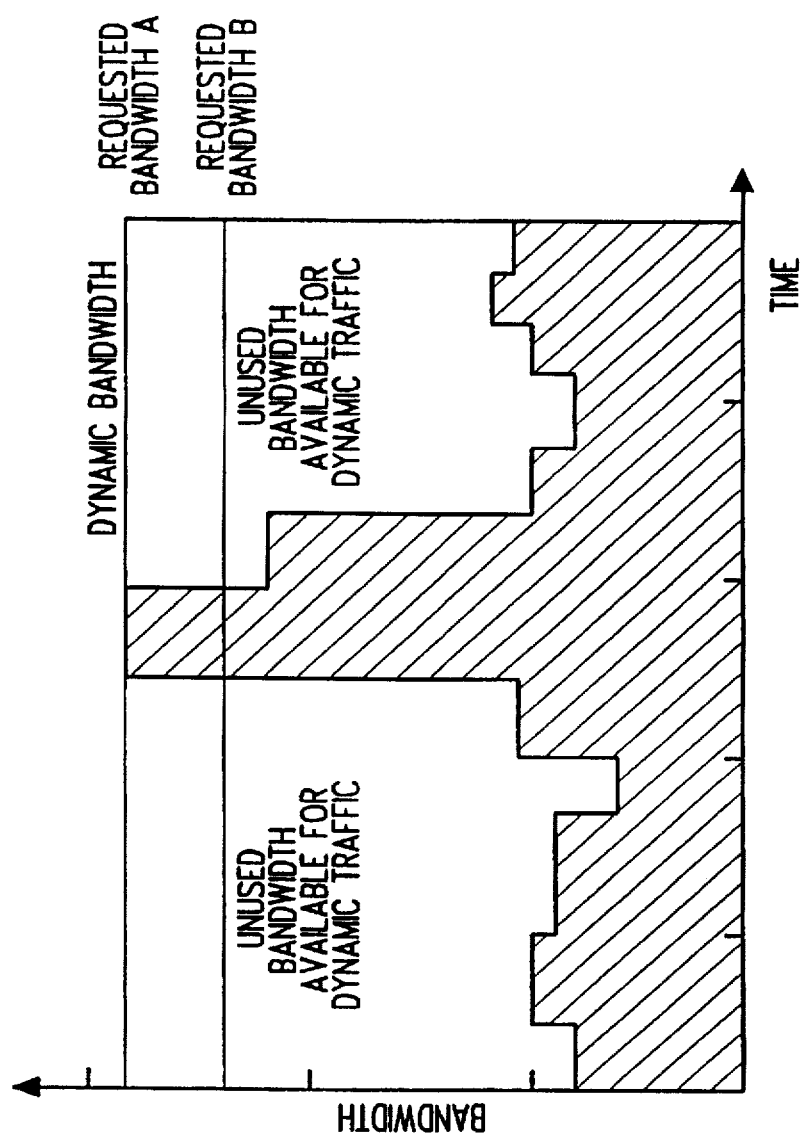
FIG. 7 illustrates the relationship between a dynamic bandwidth threshold, allocated bandwidth, and dynamic bandwidth in the present invention.

With regard to FIG. 7, a dynamic bandwidth threshold for a queue of CBR cells, or cells requiring a dedicated bandwidth, would be established such that the requested bandwidth (labelled "A" in FIG. 7) meets or exceeds the requirement. For other applications which may be more bursty but which still require tightly bounded delay, a dynamic bandwidth threshold such as that labelled "B" in FIG. 7 may be suitable, wherein the majority of the traffic is handled by allocated bandwidth, with momentary bursts handled by high-priority dynamic bandwidth. In either case, bandwidth specifically allocated but unused is made available to the BA by the TSPP for dynamic bandwidth allocation.

Note that for categories of service which rely solely on allocated bandwidth, the dynamic bandwidth threshold is set above any expected peaks in cell reception. Conversely, for categories of service having no (or low) delay bounds and no guaranteed bandwidth, such as UBR, the dynamic bandwidth threshold is set to zero.

As discussed, each queue is also a linked list, wherein the queue descriptor, resident in the control RAM 41, has a head pointer pointing to the first buffer belonging to the queue and containing a cell, and a tail pointer pointing to the last buffer belonging to the queue and containing a cell. The input cells are buffered in the cell buffer RAM 32. The queue header of an empty queue has a head pointer=0 and a tail pointer= head. Thus, the linked list that forms the queue is just a chain of pointers. The contents of one pointer points to the next pointer, etc. The pointer number is both the logical address of the pointer as well as the logical address of the cell buffer (i.e., the cell buffer number). There is a one-to-one mapping of a cell pointer and its corresponding cell buffer. The majority of the pointers are stored within Pointer RAM 50 along with the SAT.

Cell ordering is preserved since cells are removed from the queue in a first-in-first-out (FIFO) fashion, no matter whether allocated or dynamic bandwidth is used. This is despite the fact that a scheduling list can be granted transmission opportunities by either the SAT or by a dynamic bandwidth list. In a first embodiment, all of the queues in each dynamic bandwidth list share, in round-robin fashion, the available dynamic bandwidth for that port.

Assume that queue 4 from FIG. 4 is added to one of the scheduling lists on the dynamic bandwidth list of FIG. 5. In actuality, only pointers of the dynamic bandwidth list, the respective scheduling list, and any other queues on the scheduling list are adjusted to place a queue on this list; no physical relocation of the queue is involved. Assume that over an interval no cells are added to queue 4 as illustrated in FIG. 4 and no cells are removed from the queue as a result of allocated bandwidth being made available. If two cells are transmitted from this queue as a result of dynamic bandwidth being made available over time during this interval, the cell count in the queue would then be below the respective dynamic bandwidth threshold 37. The queue would then be removed from the dynamic bandwidth list by adjusting the pointers of the appropriate scheduling list and any other queues associated with that scheduling list. The opposite is true for a queue which receives cells above its respective dynamic bandwidth threshold. Note that the first cell to be buffered within a queue will always be the first to be transmitted, whether such transmission is via allocated or dynamic bandwidth. This is necessary to preserve the proper ordering of cells.

Therefore, at each cell time, the TSPP is assigned either allocated or dynamic bandwidth. The TSPP uses this information in deciding which connection-to use in supplying a particular cell to be transferred during that cell time.

The Bandwidth Arbiter 12 ("BA") distributes unallocated and unused-allocated switch bandwidth, the dynamic bandwidth. The distribution is based on requests and information sent by each TSPP. Each TSPP identifies to the BA output ports which will have cells sent to them for a particular cell time as a result of allocated bandwidth. In addition, each TSPP provides to the BA an indication of which output ports are requested for access via dynamic bandwidth, a product of the dynamic bandwidth lists. If a TSPP does not have an allocation on the SAT for a specific cell time, it may vie for dynamic bandwidth. Each TSPP can have several outstanding requests stored in the BA.

Each TSPP provides its dynamic bandwidth request(s) for a port(s) to the BA via a serially-communicated request to set the bits for the requested output ports. Each TSPP can set or delete bits in its respective request vector, or can change priority with respect to each request—each request has a priority level stored in conjunction therewith. These three commands are executed via a three-bit serial command sent from the respective TSPP to the BA. Up to 16 ports can be requested by the TSPP. In other words, each TSPP can request all of the output ports in a switch having sixteen output ports. A request remains set unless it is explicitly deleted by the TSPP. In the case where a request is matched by the BA with an available output port, a grant in the form of a port number is returned by the BA to the requesting TSPP. The BA interprets the requests and stores them in the form of a register bank, one for each priority with a set bit indicating a requested port.

These dynamic bandwidth requests of all vying TSPPs are fed into a Dynamic Arbitration Unit 43 of the BA, which tries to match the requests with the available (not allocated or allocated but unused) ports. Matched requests are communicated back to the TSPPs, which refer to their dynamic bandwidth lists (described above) in sending cells accordingly. State information is retained by the BA to implement a round-robin service scheme and to determine which was the last TSPP served. A TSPP is served when a Free Output Port Vector in the BA is matched to a TSPP request, whereby the requested port is granted and the request is subtracted from the Free Output Port Vector. The Free Output Port Vector is then applied to the next TSPP request in an attempt to match unassigned ports to requested ports. Eventually, the Free Output Port Vector will be all or almost all zeroes, and no further match between unassigned ports and requested ports can be found.

Figure 8:
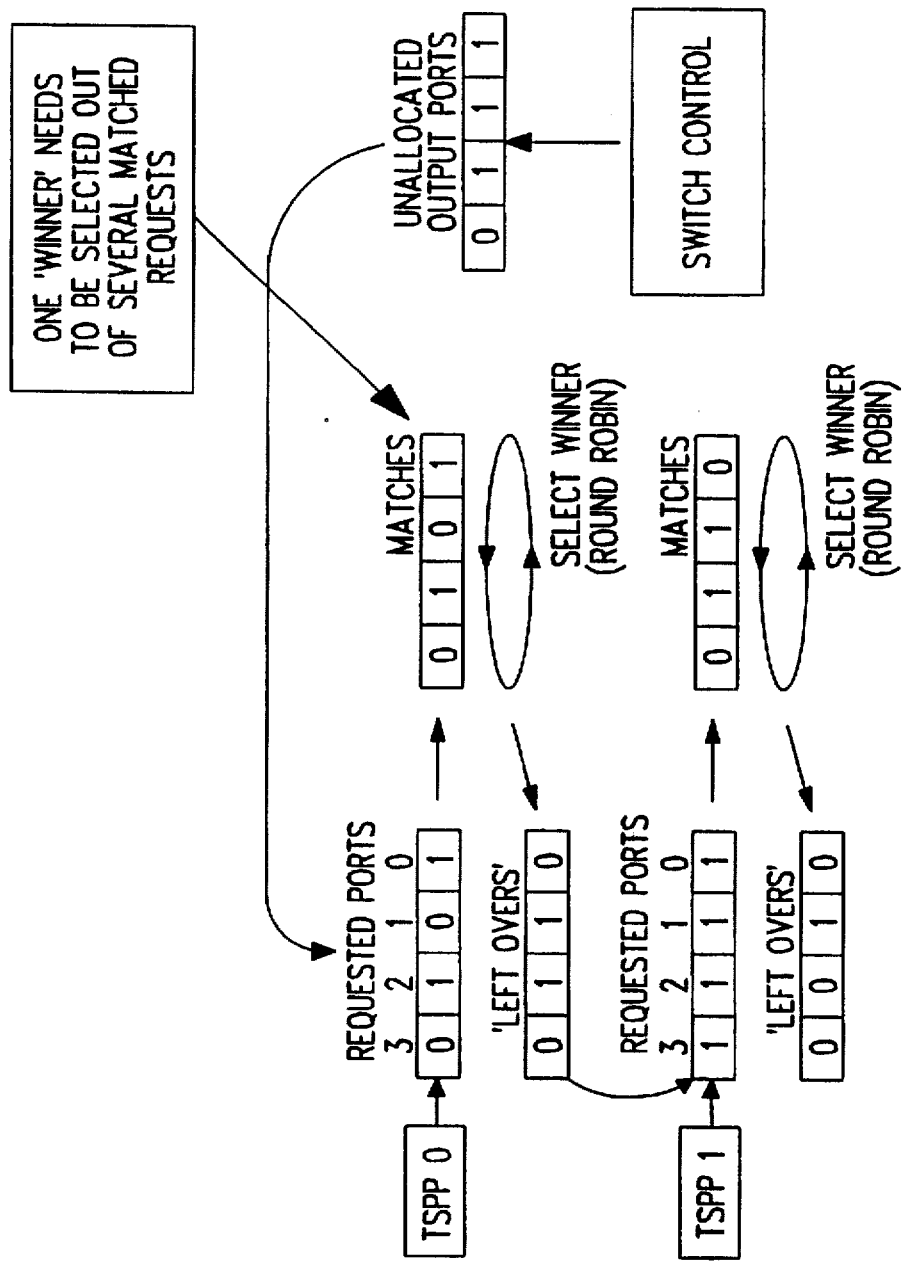
FIG. 8 illustrates the distribution of unallocated output ports for dynamic bandwidth utilization in the present invention.

FIG. 8 illustrates the matching process. Here, TSPP 0 has provided a serial request for ports 0 and 2. The BA indicates that ports 0, 1, and 2 are available for dynamic bandwidth cell transfer via the Free Output Port Vector. Assuming TSPP 0 is first in the round-robin list of TSPPs to be matched, a match for ports 0 and 2 is indicated. In point-to-point ("P2P") communication, only one matching port is granted to TSPP 0, in the illustration, port 0. The BA now has ports 1 and 2 left in the Free Output Port Vector for matching with the next requesting TSPP. TSPP 1 has requested ports 0-3. Ports 1 and 2 match with the left-over available list. Port 2 is granted, and the new left-over Free Output Port Vector includes port 1. The BA matching process continues until all available ports are granted by the BA, or no unmatched TSPP requests remain.

In an embodiment supporting point-to-multipoint ("P2M") cell transfer, matches to P2M request are sought prior to seeking matches to P2P requests, since it is more difficult to match all requested ports from one TSPP at once.

To allow the use of allocated and shared (i.e., dynamic) resources at the output port by a single connection, cell transfers are tagged to indicate whether they were above or below their allocated cell rate. The tagging is performed by the BA. If a cell is shipped using a SAT slot, it is tagged as scheduled. If the cell is shipped because it won bandwidth arbitration, it is tagged as not scheduled. This information is employed in FSPP processing, as described below.

Traffic of different priority levels is supported in the presently disclosed switch through the assignment of requests to one of four priority levels by the originating TSPP. The BA separates these four levels into either "high" or "low" priority, and attempts to match all high-priority requests prior to attempting to match all low-priority requests.

Prior to receiving a cell through the switch fabric, an FSPP receives control information indicative of whether the cell transfer utilizes scheduled bandwidth or a dynamic bandwidth. The control information further indicates the queue(s) within which the cell is to be enqueued. This information allows the FSPP to determine whether it has sufficient resources such as queue space, buffer space, bandwidth, etc., to receive the cell.

If the FSPP does not have sufficient resources to receive a cell, it indicates this by asserting an appropriate control signal. The assertion of this signal means the FSPP is able to receive the cell or the FSPP is not present.

As illustrated in FIG. 1, external to the FSPP 16 are four memories, Control RAM 1 61, Control RAM 2 63, Cell Buffer RAM 19, and QFC RAM 67. Control RAM 1, Control RAM 2, and Cell Buffer RAM are used to enqueue and dequeue cells. Control RAM 1 and Control RAM 2 contain the information required to implement the queues, dynamic lists and preferred lists (discussed below) necessary to provide the FSPP functions. The Cell Buffer RAM is where the actual cells are buffered while they await transmission. The QFC RAM primarily contains storage for a flow control information received from the TSPP, and is accessed during the generation of flow control update cells.

The cell buffer is divided into cell buffer locations, each capable of holding a single cell. Cell buffer locations within the cell buffer are pointed to using cell numbers. The starting address of a cell buffer location is derived from the cell number; each cell buffer location has a unique cell number pointing to that cell buffer location within the cell buffer.

The total number of cell buffer locations is divided among plural cell buffer pools, each dedicated to an internal cell scheduling resource. Each pool is implemented using two internal registers. The cell buffer pool count register contains the current number of cell buffer locations in use for that pool. The cell buffer pool limit register contains the maximum number of cell buffer locations allowed for that pool.

Figure 9:
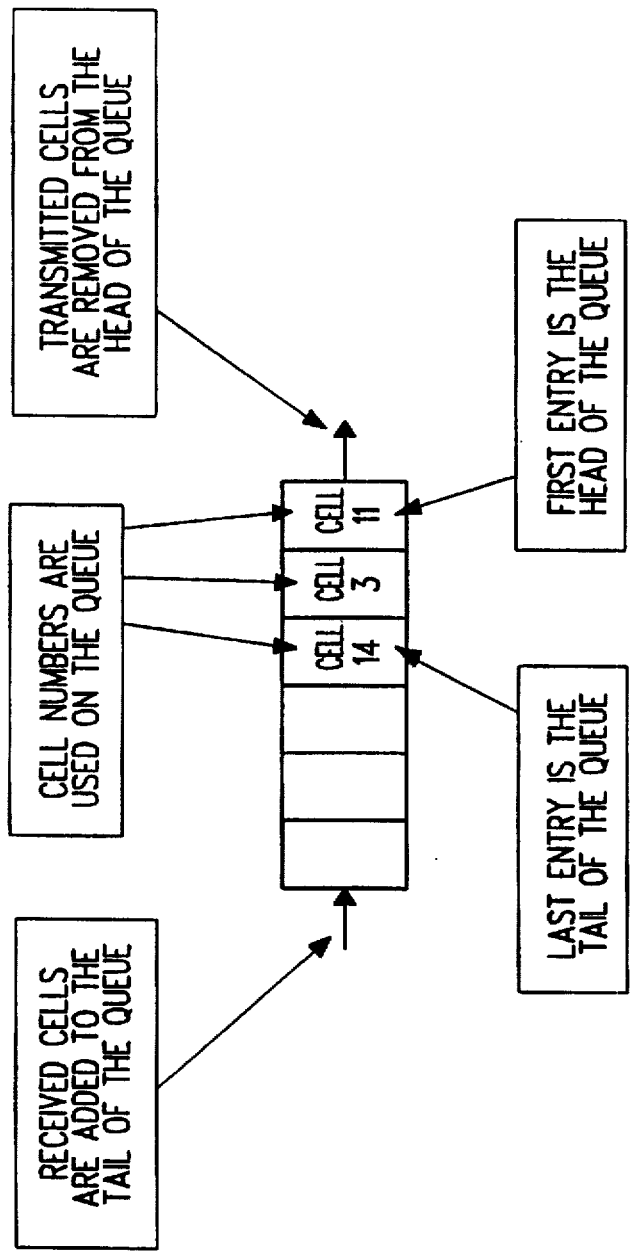
FIG. 9 is an exemplary queue as used in the present invention.

Cell numbers are manipulated to place cell buffer locations into queues. When a cell buffer location in the cell buffer is written with a cell, the cell number pointing to that cell buffer location is then placed on a queue. Cells are transmitted from the queues in the order in which they were received; the first received is the first transmitted. A logical representation of such a queue is illustrated in FIG. 9. Each queue is implemented as a linked list of cell numbers; each cell on the queue points to the next cell on the queue using its cell number as a pointer, as previously described. Each queue has a separate structure, known as the queue descriptor, maintained in Control RAM 2 to point to the head and tail of the queue. The linked list making up a queue is implemented as a set of pointers in Control RAM 1 such that each cell buffer location has one entry. The pointers are indexed using the cell number, with each entry containing another cell number. Thus, one cell number can point to another cell number. The queue descriptor also contains a count of the cells in the queue.

Once a cell is placed on a queue, that queue must then be scheduled for transmission. This is done by placing the queue number of that queue on a list. There are different types and priorities of lists within the FSPP. Lists are linked lists of queue numbers, similar to the scheduling lists of the TSPP. Each list has a separate structure, known as the list descriptor, maintained internal to the FSPP to point to the head and tail of the list.

There are two categories of traffic to be scheduled for transmission: allocated traffic and dynamic traffic. The control information associated with each cell received in the FSPP indicates to which of these two categories the cell belongs.

Figure 10:
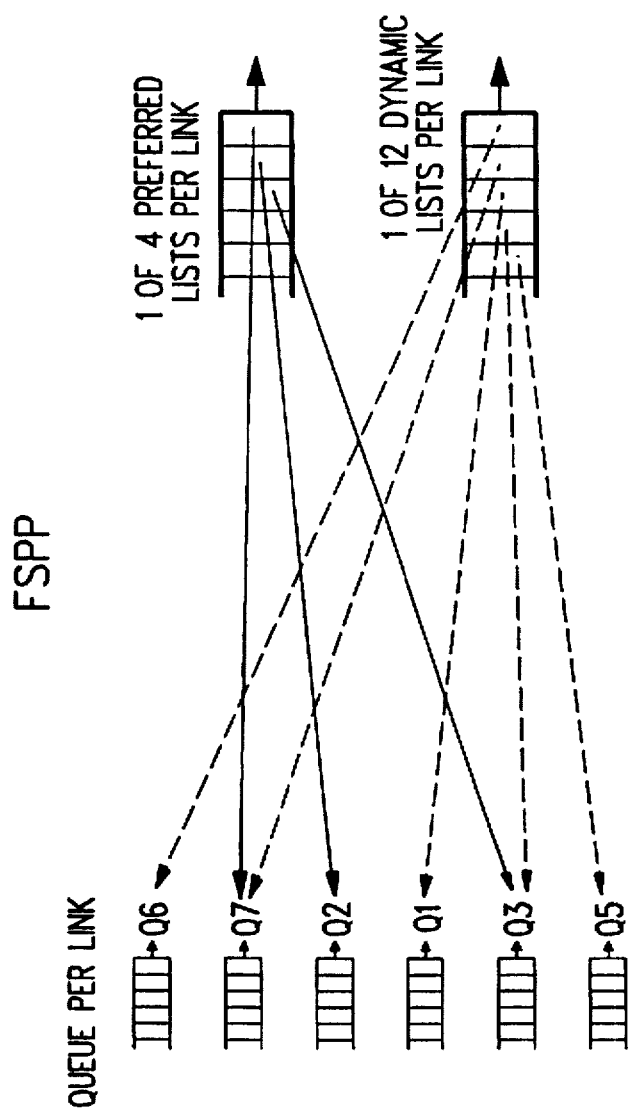
FIG. 10 illustrates the placement of queues on preferred and/or dynamic lists within the FSPP in the present invention.

Two types of lists are used for scheduling the two types of traffic: preferred lists and dynamic lists. The queue numbers of queues having allocated traffic are placed on the preferred list. The queue numbers of queues having dynamic traffic are placed on the dynamic list. Queues can be found on both the preferred list and the dynamic list since each queue may have both scheduled and unscheduled cells, as shown in FIG. 10. Here, the first entry in the preferred list is a pointer to queue 7, labelled Q7. Note that Q7 is also pointed to by the second entry in the illustrated dynamic list. The preferred list will be serviced before the dynamic list.

If a queue has no cells assigned to it, it is obviously on neither the preferred list nor the dynamic list. If the queue receives one cell via dynamic bandwidth, the queue is placed on the dynamic list. If the queue receives a second cell, but this time via allocated bandwidth, the queue is also placed on the preferred list. Since servicing of preferred lists take precedence over servicing of dynamic lists, the first cell received in the queue will be chosen for transmission out of the switch via the preferred list, not the dynamic list. The queue will remain on the dynamic list after being removed from the preferred list until the remaining cell is chosen for transmission. Therefore, even though the queue was first placed on the dynamic list, then the preferred list, the first cell is dequeued via the preferred list. This is necessary to ensure and maintain proper cell ordering.

The BA is responsible for tagging each cell as either shipped in an allocated SAT slot, or as shipped in an unscheduled dynamic slot. It is this information which is used in assigning queues to preferred and/or dynamic lists.

Some queues have mixed service traffic with both allocated and dynamic cells. This is a result of providing integrated services whereby a particular connection may have cells to transmit beyond the respective dynamic bandwidth threshold (see discussion pertaining to FIG. 7 above). Cells below the threshold are sent as allocated traffic. Cells above the threshold may be sent as dynamic traffic. Queue numbers for the allocated traffic are placed on the preferred list, and queue numbers for the dynamic traffic are placed on the dynamic list. Regardless of order of receipt between allocated and dynamic cells, cells from the queue numbers on the preferred list will be scheduled and removed first. The cells are still transmitted in order out of the FSPP, however, since the cell numbers on the queue remain in order and cell numbers are always removed from the head of the queue. Therefore, even if an individual cell at the head of an output queue was received in the FSPP as an unscheduled, dynamic cell, it will be transmitted first, even if the queue is identified next on a preferred list.

Once a queue number has been added to a list, either a preferred list or a dynamic list, it remains on that list until the queue has no more cells of the appropriate type. When a queue number makes it to the head of the list, that queue becomes the next queue within the list from which a cell is transmitted. When the cell is transmitted, the queue number is removed from the head of the list and the count of either allocated cells for a preferred list or dynamic cells for a dynamic list is decremented within the queue descriptor. If the decremented counter is non-zero, the queue number is returned to the tail of the list. Otherwise it is dropped from the list.

By servicing the queue number from the head of the list and returning it to the tail of the list, the queues within a list receive round-robin scheduling.

Figure 11:
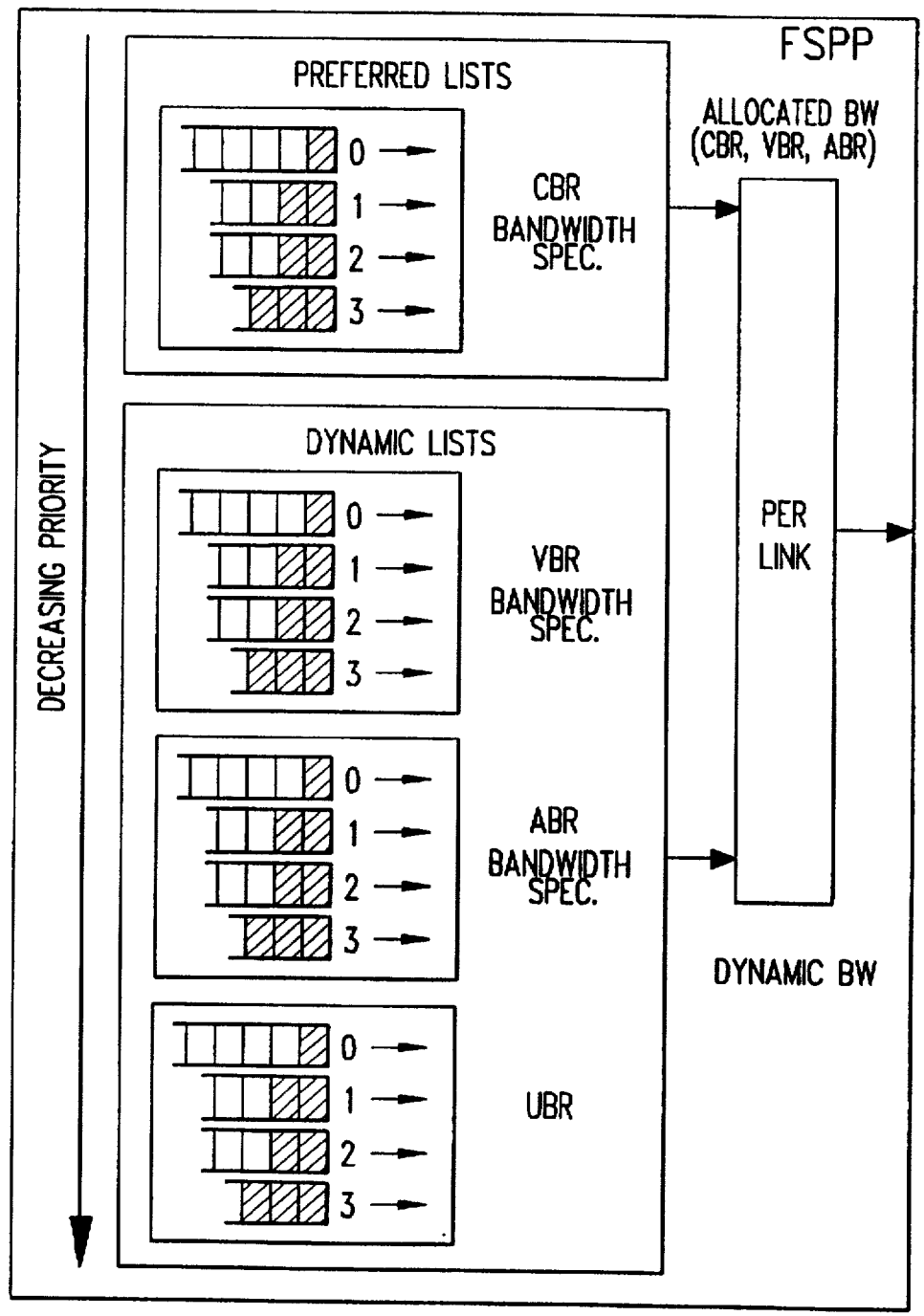
FIG. 11 illustrates preferred and dynamic lists in an FSPP according to the present invention.

With reference to FIG. 11, four priorities of preferred lists are provided for each output link to provide delay bounds through the switch for differentiation of different levels of service. Each output link is scheduled independently, so there is no interaction between the preferred lists for different links. Newly received cells in a higher priority list are transmitted before previously received cells in a lower priority preferred list.

All the preferred lists with allocated traffic for a link are scheduled with a priority above dynamic lists with dynamic traffic for that link.

There are three types of dynamic lists, with four priorities for each type: VBR, ABR, UBR, as shown in FIG. 10. Each type of list is permanently assigned to each output link. In a preferred embodiment of the presently disclosed switch, the four priorities for each of the VBR and ABR dynamic lists are further divided among two priority levels assigned by the BA: high (bandwidth not met); and low (bandwidth exceeded). These two levels enable the VBR service class to achieve a preselected percentage of dynamic bandwidth before allowing a lower priority service class, ABR, to share in the dynamic bandwidth. Once ABR has achieved its preselected percentage, the remaining dynamic bandwidth is shared among VBR, ABR and UBR.

Four priorities exist for VBR lists, VBR0-3. VBR has a lower latency, but may have cell loss. VBR dynamic lists are guaranteed a minimum bandwidth on an output link. Once the VBR dynamic lists with traffic have received their guaranteed bandwidth, the ABR dynamic list transmits if its minimum bandwidth has not been reached. When the minimum bandwidth for both VBR and ABR have both been satisfied, the UBR, VBR and ABR dynamic lists vie in round robin fashion for the remaining bandwidth.

ABR also provides four levels of priority. It differs from VBR in that it guarantees no cell loss because flow control is utilized. ABR dynamic lists are also guaranteed minimum bandwidth on an output link. As noted above, once ABR minimum bandwidth has been satisfied, UBR, VBR, and ABR all vie in round-robin fashion for remaining bandwidth.

The list of lists structure introduced with respect to FIGS. 5 and 7 is also applicable to the processing of cells at the FSPP. Specifically, with regard to FIG. 10 once again, each "cell" illustrated on one of the preferred and dynamic lists is actually a pair of pointers to a queue having one or more cells to be transmitted from the respective port at the respective priority. Each queue is entered only once on a particular list. If that queue has more than one cell to be transmitted, the queue is put on the list again, but behind all other queues already on the list. Round-robin queue servicing is thus enabled. In summary, each list entry points to a linked list of cells to be transmitted—it is a list of lists. Fairness is provided between queues of like priority, prioritization between lists is enabled, and cell prioritization is maintained.

In this fashion, allocated traffic is transmitted first. Any remaining bandwidth is transmitted according to a prioritized scheme. Thus, multiple classes of service can be provided through the same switch, enabling a customer to pay for the level of service desired (in terms of bandwidth and latency), while maximizing the utilization of the switch bandwidth.

Having described preferred embodiments of the invention, it will be apparent to those skilled in the art that other embodiments incorporating the concepts may be used. For instance, simple variations on the data rates specified herein are to be considered within the scope of this disclosure.

These and other examples of the invention illustrated above are intended by way of example and the actual scope of the invention is to be limited solely by the scope and spirit of the following claims.

What is claimed is:

1. A data switch providing integrated services to data cells transmitted therethrough, each data cell identified as belonging to one of multiple service classes, said switch comprising:

plural input port processors, each for buffering and enqueuing input data cells and for transmitting said input data cells through said switch using either allocated or dynamic intra-switch bandwidth;

a bandwidth arbiter, in communication with said input port processors, for arbitrating said dynamic intra-switch bandwidth among said input port processors, and for tagging said input data cells as allocated or dynamic intra-switch bandwidth transmitted data cells;

plural output port processors, in communication with said input port processors and said bandwidth arbiter, each for buffering and enqueuing said tagged transmitted data cells, according to said tag and data cell service class information, in a prioritized manner; and a switch fabric enabling said communication between said input port processors, said bandwidth arbiter, and said output port processors.

2. The switch of claim 1 wherein each of said input processors is further for generating scheduling lists comprised of linked lists of queues of said input data cells, each of said scheduling lists having associated therewith data cells belonging to a common connection.

3. The switch of claim 2 wherein each of said input processors is further maintaining a switch allocation table having plural entries, each of said entries identifying one of said scheduling lists, said switch allocation table enabling the transmission of said input data cells using said allocated intra-switch bandwidth.

4. The switch of claim 3 wherein each of said input processors is further for maintaining plural dynamic bandwidth lists, each relating to a respective one of said output processors and comprising a linked list of at least one scheduling list, said dynamic bandwidth lists enabling transmission of said input data cells using said dynamic intra-switch bandwidth.

5. The switch of claim 4 wherein each of said input processors is further for maintaining a dynamic port list for conveyance to said bandwidth arbiter, said dynamic port list indicating which of said output processors are requested by said dynamic bandwidth list scheduling lists, and at what priority.

6. The switch of claim 5 wherein said bandwidth arbiter is further for identifying which of said output processors is not scheduled for receipt of an input data cell via said allocated intra-switch bandwidth from an input processor, and for matching said output processors not so scheduled with requested output processors on said dynamic port list based upon said priority.

7. The switch of claim 6 wherein said bandwidth arbiter is further for conveying to said input processor an available output processor which corresponds to a request by said input processor.

8. The switch of claim 1 wherein each of said output processors is further for receiving an identification of an input data cell to be transmitted by one of said input processors and for providing an indication to said input processor to inhibit said transmission of said input data cell based upon said identification.

9. The switch of claim 1 wherein each of said output processors is further for maintaining allocated and dynamic list structures for each of said data cells received from said input processors via said allocated and dynamic intra-switch bandwidth, respectively.

10. The switch of claim 9 wherein each of said output processors is further for transmitting data cells associated with said allocated list structures out of said switch before data cells associated with said dynamic list structures.

11. The switch of claim 9 wherein each of said output processors is further for providing said allocated and dynamic list structures for each of said multiple service classes.

12. The switch of claim 11 wherein each of said output processors is further for providing said multiple service class list structures for each of plural priorities.

13. A communications switch providing integrated services to data cells transmitted therethrough, each data cell identified as belonging to one of multiple service classes, said switch having at least one input port in communication with an input communications link, at least one output port in communication with an output communications link, and a switch fabric therebetween, said switch comprising:

an input processor, associated with each of said at least one input ports, for buffering, enqueuing and transmitting said data cells received from said input communications link according to a determination, made by said input processor, of whether allocated or dynamic intra-switch bandwidth may be utilized in transmitting said enqueued data cells across said switch fabric;

a bandwidth arbiter, in communication with said at least one input processor, for arbitrating said dynamic intra-switch bandwidth among said input processors, and for tagging said data cells with a tag indicative of whether a respective data cell has been transmitted across said switch fabric utilizing said allocated or said dynamic intra-switch bandwidth; and an output processor, associated with each of said at least one output ports, for buffering and enqueuing said data cells transmitted by at least one of said input processors, tagged by said bandwidth arbiter, and received across said switch fabric, said output processor utilizing said bandwidth arbiter tag and data cell service class information in enqueuing said data cells for transmission to said output communications link in a prioritized manner.

14. The switch of claim 13 wherein said input processor is further capable of verifying valid header data format associated with each of said data cells.

15. The switch of claim 13 wherein said input processor is further capable of verifying a valid connection identifier from header data for each of said data cells.

16. The switch of claim 13 wherein said input processor is further capable of analyzing a connection identifier from header data for each of said data cells in associating said data cell with a queue for the respective connection.

17. The switch of claim 13 wherein said input processor enqueues said data cells for a particular connection in a single queue in order of data cell reception from said input communications link.

18. The switch of claim 13 wherein said input processor is further capable of reformatting said data cells received from said input communications link into a switch-internal format.

19. The switch of claim 13 wherein said input processor is further capable of generating scheduling lists comprised of linked lists of queues of said data cells identified as belonging to a common connection.

20. The switch of claim 19 wherein said input processor maintains a respective switch allocation table comprising plural entries, each entry identifying a respective one of said scheduling lists, said switch allocation table enabling transmission of said enqueued data cells through said switch employing said allocated intra-switch bandwidth.

21. The switch of claim 20 wherein said input processor maintains a dynamic bandwidth list for each of said output ports, each said dynamic bandwidth list comprising a linked list of at least one of said scheduling lists, said dynamic bandwidth lists enabling transmission of said enqueued data cells through said switch employing said dynamic intra-switch bandwidth.

22. The switch of claim 21 wherein said input processor maintains a dynamic port list for conveyance to said bandwidth arbiter, said dynamic port list providing an indication to said bandwidth arbiter of which output ports are requested by said scheduling lists associated with said input processor, and at what priority.

23. The switch of claim 22 wherein said bandwidth arbiter is further capable of identifying which of said output ports are not scheduled for receipt of data cells via said allocated intra-switch bandwidth by said input processor, and of matching said output ports not scheduled with said requested output ports on said dynamic port list based upon said priority.

24. The switch of claim 23 wherein said bandwidth arbiter further conveys to said input processor an available output port which matches one of said output ports requested by said input processor.

25. The switch of claim 24 wherein said bandwidth arbiter is further capable of maintaining a history of which input processors were provided with a requested output port in providing a fairness in output port distribution.

26. The switch of claim 13 wherein said bandwidth arbiter is further capable of receiving from said input processor a queue vector which identifies a destination output processor for ones of said data cells to be transmitted through said switch.

27. The switch of claim 13 wherein said input processor identifies, to at least one of said output processors via said switch fabric, a data cell to be transmitted to said at least one output processor, and said at least one output processor is further capable of identifying, for said data cell to be transmitted, via said switch fabric, said bandwidth arbiter-provided tag and a respective queue for buffering said data cell at said output port.

28. The switch of claim 27 wherein said output processor is further capable of providing a signal to said input processor providing said data cell to be transmitted, via said switch fabric, said signal inhibiting transmission of said data cell until receipt by said input processor of a further signal from said output processor.

29. The switch of claim 13 wherein said output processor is further capable of maintaining list structures for each of data cells received via said allocated and dynamic intra-switch bandwidths, said list structures comprising linked lists of queues having data cells for transmission to said output communications link.

30. The switch of claim 29 wherein each of said queues is restricted, by said output processor, to one entry within said linked list of queues for each of said list structures.

31. The switch of claim 29 wherein said output processor is further capable of transmitting data cells from queues found on said allocated intra-switch bandwidth list structure before transmitting data cells from queues found on said dynamic intra-switch bandwidth list structure.

32. The switch of claim 29 wherein said output processor is further capable of providing said allocated and dynamic intra-switch bandwidth list structures for each of said multiple service classes.

33. The switch of claim 32 wherein said output processor is further capable of providing said multiple service class list structures for each of plural priorities.

34. A method of forwarding a data cell through a communications switch having an input port, an input processor associated with said input port, an output port, an output processor associated with said output port, a switch fabric disposed between said input port and said output port, and a bandwidth arbiter associated with said switch fabric, said method comprising the steps of:

input buffering and enqueuing a data cell received at said input port by said input processor according to whether said data cell is to be forwarded, via said switch fabric, to said output port via allocated or dynamic intra-switch bandwidth;

tagging said buffered and enqueued data cell by said bandwidth arbiter as a data cell to be forwarded over said switch fabric via said allocated or dynamic intra-switch bandwidth;

forwarding said tagged data cell over said switch fabric by said input processor to said output processor; and output buffering and enqueuing said forwarded data cell, by said output processor at said output port, according to said tag, in a prioritized manner.

35. The method of claim 34 wherein said input buffering and enqueuing step further comprises error checking, by said input processor, a header associated with said data cell.

36. The method of claim 34 wherein said input buffering and enqueuing step further comprises identification, by said input processor, of a connection to which said data cell corresponds from header data associated with said data cell.

37. The method of claim 34 wherein said input buffering and enqueuing step further comprises converting said data cell to a switch-internal data cell format by said input processor.

38. The method of claim 34 wherein said input buffering and enqueuing step further comprises the step of generating, by said input processor, scheduling lists comprised of linked lists of queues identified as belonging to a common connection.

39. The method of claim 38 wherein said input buffering and enqueuing step further comprises the step of maintaining, by said input processor, a switch allocation table comprising plural entries, each entry identifying a respective one of said scheduling lists, said switch allocation table enabling transmission of said enqueued data cell through said switch employing said allocated intra-switch bandwidth.

40. The method of claim 38 wherein said input buffering and enqueuing step further comprises the step of maintaining, by said input processor, a dynamic bandwidth list for said output port, said dynamic bandwidth list comprising a linked list of at least one of said scheduling lists and enabling transmission of said enqueued data cell through said switch employing said dynamic intra-switch bandwidth.

41. The method of claim 40 wherein said input buffering and enqueuing step further comprises the step of maintaining a dynamic port list, by said input processor, said dynamic port list to provide an indication to said bandwidth arbiter of whether said output port is requested by said scheduling lists associated with said input processor, and at what priority.

42. The method of claim 41 wherein said tagging step further comprises the step of identifying, by said bandwidth arbiter, whether said output port is scheduled for receipt of said data cell via said allocated intra-switch bandwidth by said input processor during a first interval, and of matching, by said bandwidth arbiter, said output port not scheduled during said first interval with said output port request on said dynamic port list based upon said priority.

43. The method of claim 42 wherein said step of matching further comprises the step of conveying, by said bandwidth arbiter, said matched output port to said requesting input processor.

44. The method of claim 42 wherein said step of matching further comprises the step of maintaining a history of matched output port requests.

45. The method of claim 34 wherein said step of tagging further comprises the step of receiving, by said bandwidth arbiter, a queue vector, from said input processor, for identifying a destination output processor for said enqueued data cell to be transmitted through said switch.

46. The method of claim 34 wherein said step of forwarding said tagged data cell further comprises the step of providing, by said output processor, a signal to said input processor inhibiting said forwarding of said tagged data cell until said output processor provides a second signal to said input processor.

47. The method of claim 34 wherein said step of output buffering and enqueuing further comprises the step of maintaining, by said output processor, list structures for each of data cells received from said input processor via said allocated and dynamic intra-switch bandwidth, said list structures comprising linked lists of queues each having data cells for transmission from said output port.

48. The method of claim 47 wherein said step of maintaining further comprises entering, by said output processor, a queue, having a data cell for transmission from said output switch, on said linked list of queues only once for each of said list structures.

49. The method of claim 47 wherein said step of maintaining further comprises transmitting data cells from queues found on said allocated intra-switch bandwidth list structure before transmitting data cells from queues found on said dynamic intra-switch bandwidth list structure.

50. The method of claim 47 wherein said data cell is associated with one of plural service classes and said step of maintaining further comprises providing plural allocated and dynamic intra-switch bandwidth list structures for each of said multiple service classes.

51. The method of claim 50 wherein said step of maintaining further comprises providing said multiple service class list structures for each of plural priorities.

* * * * *

UNITED STATES PATENT AND TRADEMARK OFFICE
CERTIFICATE OF CORRECTION

PATENT NO. : 5,748,629 Page 1 of 1
DATED : May 5, 1998
INVENTOR(S) : Stephen A. Caldara et al.

It is certified that error appears in the above-identified patent and that said Letters Patent is hereby corrected as shown below:

Column 4,
Line 41, "CRI" should read -- CR1 --.

Signed and Sealed this

Eighth Day of January, 2002

*Attest:*

*Attesting Officer*

JAMES E. ROGAN
*Director of the United States Patent and Trademark Office*